Sept. 18, 1962    K. ZYSSET    3,054,432
FOOD SLICER
Filed Sept. 25, 1959    3 Sheets-Sheet 3
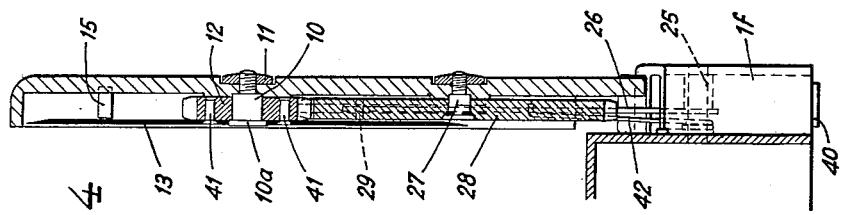
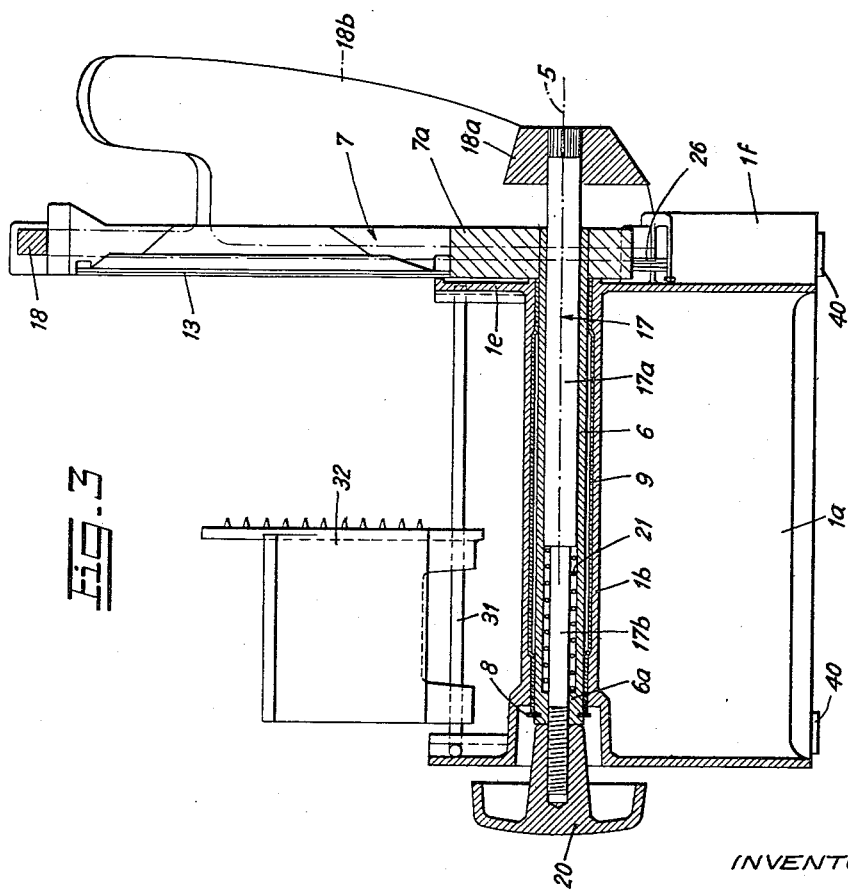
INVENTOR
KARL ZYSSET

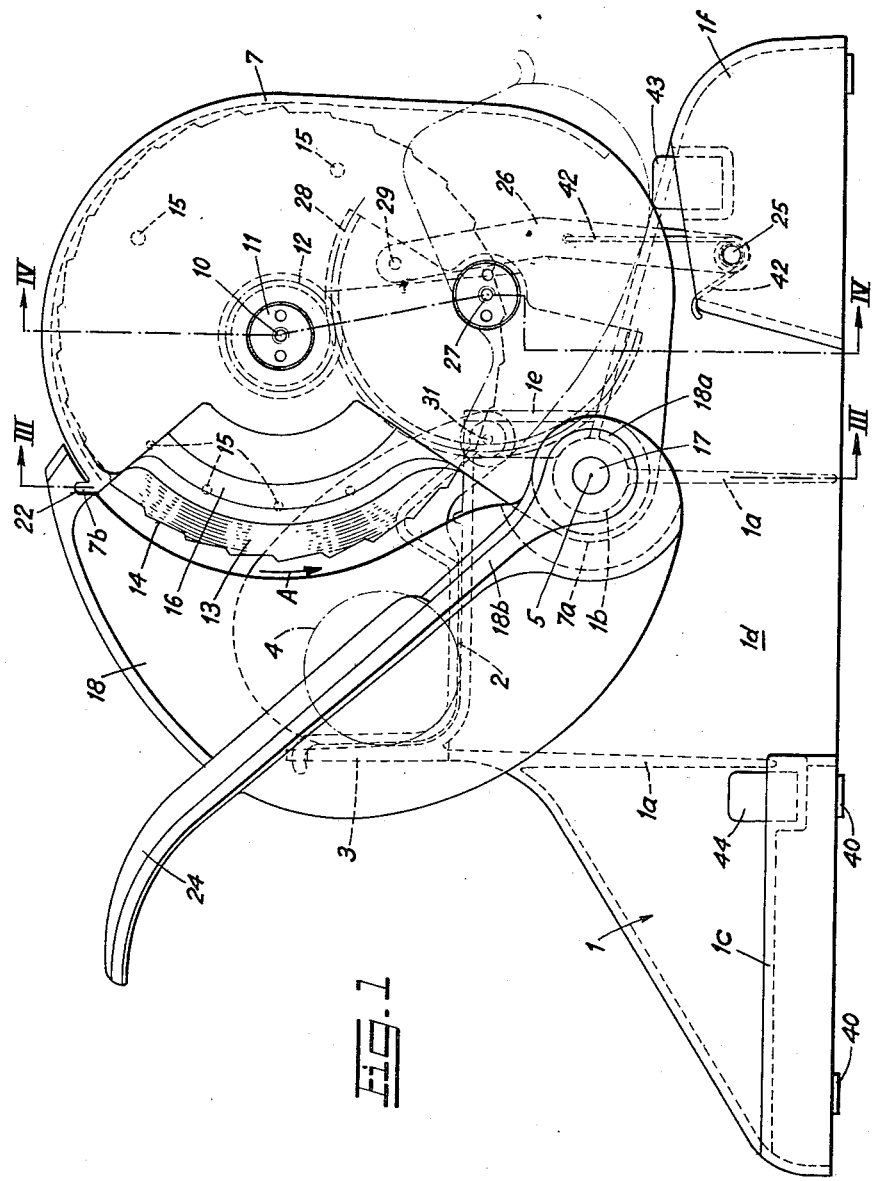

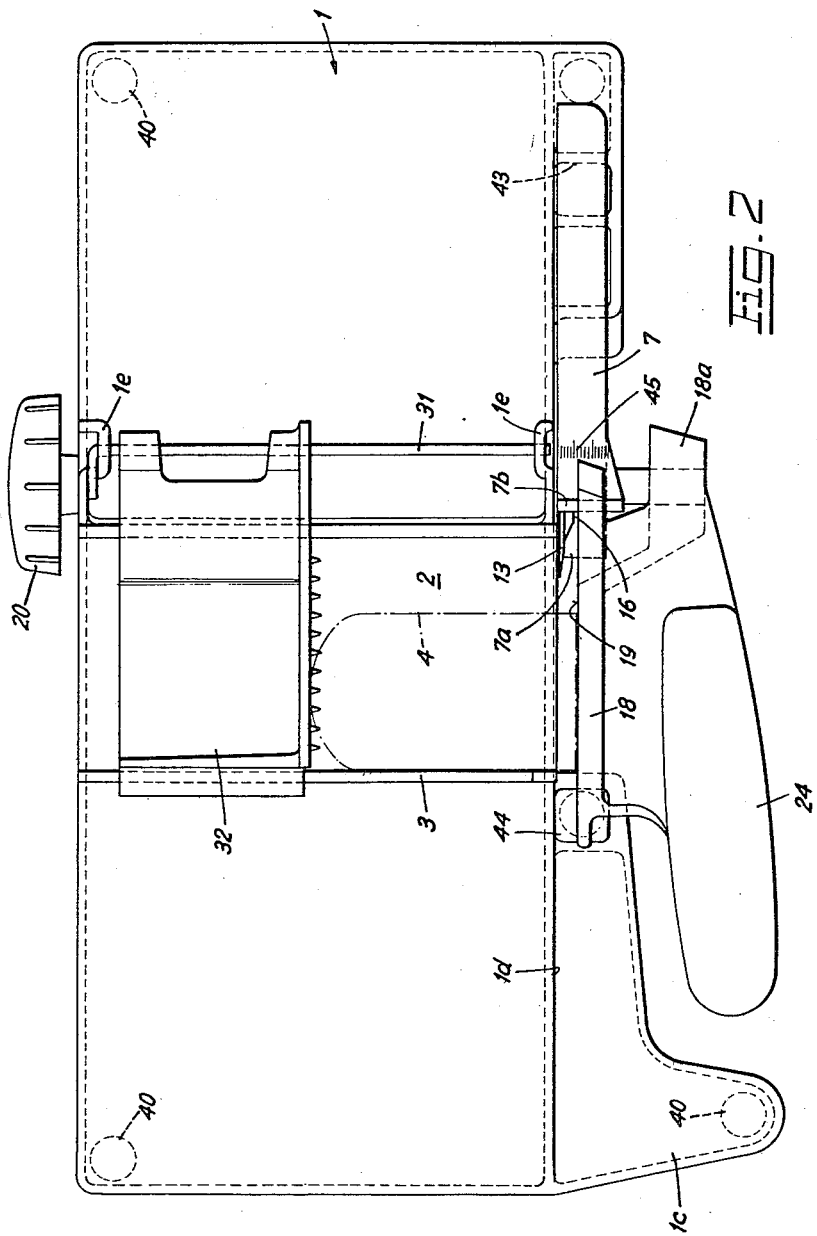

United States Patent Office 3,054,432
Patented Sept. 18, 1962

3,054,432
FOOD SLICER
Karl Zysset, Hauptstrasse 31, Lyss, Berne, Switzerland
Filed Sept. 25, 1959, Ser. No. 842,512
Claims priority, application Switzerland Oct. 1, 1958
4 Claims. (Cl. 146—103)

My present invention relates to improvements in food slicers primarily destined for household use.

Various makes of such food slicers are known of which the cutting disk is rotated by a motor, power means being provided in most cases for stepwise feeding the goods to be cut. Such slicers on account of their high prices are practically used only in retail shops and kitchens of restaurants and the like.

The object of my present invention is an improvement of a food slicer of the kind known comprising a food platform, a swing arm pivoted to the supporting frame, a cutting disk pivoted to said swing arm, and a drive connection between said disk and said frame through which the disk is rotated when the swing arm is actuated.

All of known constructions have various disadvantages, for example with respect to reliability, maintenance, initial costs, length of life and easy operation. My present invention aims to provide a food slicer of the disk type or, respectively, a novel construction of the drive connection between supporting frame and cutting disk which is free of these disadvantages.

The food slicer disclosed in the present invention is distinguished by the fact that the drive connection between cutting disk and supporting frame comprises a link pivoted to the frame, a toothed member rotatably mounted on the swing arm and pivoted to said link, and a pinion coaxial with and connected to the cutting disk and in continuous engagement with said toothed member.

One form of the invention is shown, by way of example, in the drawing, in which—

FIG. 1 is an elevation,
FIG. 2 is a top plan view, and
FIGS. 3 and 4 are cross-sections on the lines III—III and IV—IV respectively of FIG. 1.

The slicer shown comprises a supporting frame 1 suitably die-cast of plastic, which for reinforcement has partitions 1a and which is provided with rubber legs 40. In its intermediate portion, frame 1 has a raised saddle with a horizontal platform 2 constituting a supporting means for an object to be sliced and being parallel to the frame base. A vertical web 3 extends from that edge of the saddle which in FIG. 1 is situated on the left, across the entire width of the frame, and serves for guiding the object 4 to be sliced, which in FIGS. 1 and 2 is indicated by dash-and-dot lines. The platform 2 as well as the guiding face formed on web 3 are parallel to the axis 5 (FIG. 1) of a hollow cylindrical frame portion 1b (FIG. 3) which at one end is stepwise enlarged. Frame 1 on its frontside has a projecting tail 1c on the left end (FIGS. 1 and 2) for widening its base. The major portion of the frontwall or endface 1d of the supporting frame extends at right angles to platform 2, web 3 and axis 5.

In the hollow cylindrical frame portion 1b is fitted a thin-walled metallic bushing 9 in which a hollow shaft 6 is rotatably mounted, shaft 6 (FIG. 3) being made of brass for example. On that end of shaft 6 which projects from the front of the supporting frame, is fixed the portion 7a of a swing arm 7 which is adjacent to the frame. The rear end of the hollow shaft 6 is provided with an exterior annular groove in which is inserted a spring ring 8 abutting against the rear end of bushing 9 and thereby preventing shaft 6 from moving forwardly.

A pinion 12 is rotatably mounted on swing arm 7 on a pin 10 which has a head 10a and is secured by a nut 11 screwed thereon. To pinion 12 is secured a coaxial cutting disk 13 by means of countersunk rivets 41, and the cutting edge 14 of said disk is formed as shown in FIG. 1. Disk 13 is slidably supported on a plurality of studs 15 inserted in swing arm 7. The latter covers the greater part of the cutting disk 13, and at the point where the cut-off slices are stripped, it has on the frontside a recessed conical face 16.

In the holow axle 6 is mounted rotatably and axially movable the thicker portion 17a of a shaft 17. To that end of portion 17a which projects from hollow shaft 6, is fixed the hub-shaped portion 18a of a gauge plate 18. The entire rear face 19 (FIG. 2) of gauge plate 18 facing frame 1, stands at right angles to the common axis of rotation 5 of swing arm 7 and stop plate 18 and serves as abutment face for the object 4 which is cut in slices. The thickness of the slices is determined by the spacing between said face 19 and the plane of the knife edge 14 of cutting disk 13. To make possible the adjustment of this spacing which can be read on a scale 45 provided on swing arm 7, so as to vary the thickness of the slices, a nut 20 is adjustable on the externally threaded rear end of the thinner shaft portion 17b. The nut abuts on the rear end of hollow shaft 6 which is provided with an enlarged interior portion 6a, under the influence of a compression spring 21 inserted with pretension between said portion 6a and the annular shoulder between the shaft portions 17a and 17b.

The abutment or gauge plate 18 which in elevation is substantially crescent-shaped, is coupled at its upper end to swing arm 7 in a non-rotatable relation, but is movable in the direction of axis 5. A nose 7b is provided on arm 7 and adapted to be engaged in a groove 22 which is parallel to the axis of rotation 5 and which is provided on the upper end of plate 18. Vice versa, the groove could be provided on the swing arm, and the nose could be provided on the abutment plate.

A rib 18b is cast to the frontside of plate 18 which serves as handle and has on the upper side a plate 24 made of plastic.

Between cutting disk 13 and supporting frame 1 is disposed a drive connection through which, when swing arm 7 is actuated, disk 13 is rotated about its own axis. Said drive connection comprises a link 26 pivoted by a pin 25 to frame 1, a spring 42, a toothed segment 28 pivoted by a pin 27 to arm 7 and further pivoted at 29 to link 26, and a pinion 12 fixed to cutting disk 13 and having teeth continuously meshing with those of a toothed segment 28. Spring 42, which is made of steel wire, is mounted with a couple of turns on pin 25, is supported by a short leg on frame portion 1f and has a long leg engaged in a hole in link 26.

In the drawing, swing arm 7 (and gauge plate 18) is shown in one of its terminal positions in which it abuts against a stop 43 made of rubber or the like and inserted in frame portion 1f. From this position, the members 7 and 18 as a unit may be swung counterclockwise (FIG. 1) through about 55° by actuating the handle 18b, 24 until plate 18 comes to abut on a stop 44 inserted in frame portion 1c. The exposed peripheral segment portion of knife 14, i.e. the portion which is not covered by arm 7 and toothed member 28, moves in front of the space above platform 2, which space is partly occupied by the object 4. As pin 27 of the toothed segment 28 travels with swing arm 7, the toothed segment turns on pin 27 since a peripheral end portion thereof is restrained by link 26 and cannot move relative to the supporting frame, except for a small distance corresponding to the resilient yielding of link 26 and spring 42. Such turning movement is transmitted through pinion 12 to cutting disk 13 which, therefore, performs a movement of about one and a third revolution in the sense of arrow A (FIG. 1) about its bearing pin 10 when the members 7, 18 are swung counterclockwise through 55° for the cutting stroke. When said members 7, 18 are swung back, the cutting disk 13 is turned back the same angle. The actuating arm 18b, 24 is moved up and down, and not in horizontal direction so that the user avoids unintentional movements of the slicer on the table top. Furthermore, the force to be exerted on the actuating arm 18b, 24 for swinging the same back is substantially reduced by spring 42 which constantly tends to turn link 26 clockwise (FIG. 1) about pin 25 and which is tensioned during the counter-clockwise downward cutting stroke.

The object 4 to be cut is fed by hand towards the abutment face 19 of gauge plate 18. The operator actuates the arm 18b, 24 with his right hand and at the same time puts the thumb of his left hand on web 3 while the other fingers of his left hand bear down directly on the rear end of the object 4. As soon as only little is left of the goods, the operator swings a slider 32 (which so far has not been used) from its position shown in FIG. 1 in dash-and-dot lines, about a bar 31, which is parallel to the axis of rotation 5 and is held retractable in upright projections 1e of frame 1, to the position of use shown in FIGS. 1 and 3 by solid lines, in order to press from now on the remainder of the object against the abutment face 19 by means of slider 32. In the position of use, the slider rests on the upper edge of web 3.

What I claim as new and desire to secure by Letters Patent is:

1. In a food slicer, in combination, a supporting frame; a platform for the goods to be cut secured to said supporting frame; a swing arm turnably mounted on said supporting frame; a cutting disk turnably mounted on said swing arm; a pinion mounted for rotation about the same axis as said cutting disk and fixedly secured to said cutting disk; a toothed member mounted on said swing arm for free turning movement about an axis, and meshing with said pinion; and a link having one end pivoted to said supporting frame and the other end pivoted to said toothed member at a point spaced from said axis so that when said swing arm moves with said disk and toothed member towards said platform, said link turns said toothed member relative to said swing arm by restraining movement of said toothed member relative to said frame whereby said pinion and said cutting disk are turned.

2. In a food slicer, in combination, a supporting frame; a platform for the goods to be cut secured to said supporting frame; a swing arm turnably mounted on said supporting frame; a cutting disk turnably mounted on said swing arm; a pinion mounted for rotation about the same axis as said cutting disk and fixedly secured to said cutting disk; a toothed member turnably mounted on said swing arm and meshing with said pinion; a link pivoted to said supporting frame and said toothed member; an actuating arm connected to said swing arm; a pin mounted in said supporting frame; and a coil spring surrounding said pin and connected to said supporting frame and to said link, and tending to move said swing arm away from said platform, so that when said swing arm moves with said disk towards said platform, said link turns said toothed member whereby said pinion and said cutting disk are turned.

3. In a food slicer, in combination, a frame having a support for an object to be cut; a swing arm mounted on said frame for turning movement to and from an operative position; a cutting disk mounted on said swing arm for turning movement about an axis and moving with said swing arm so that a peripheral segment of said cutting disk is located in the region of said support in said operative position of said swing arm for cutting the object; a pinion mounted on said swing arm for turning movement and being connected with said cutting disk for turning the same; a toothed member mounted on said swing arm for turning movement about another axis spaced from said axis and meshing with said pinion, said toothed member being spaced from said peripheral segment of said cutting disk during turning of said swing arm so as to be spaced from the region of the object; and means mounted on said frame and connected with said toothed member and restraining the same in such a manner as to cause said toothed member to turn about said other axis when said swing arm moves to and from said operative position whereby said cutting disk is turned to cut the object along said peripheral segment while said toothed member is located outside of the region of the object.

4. In a food slicer, in combination, a frame having a support for an object to be cut; a swing arm mounted on said frame for turning movement to and from an operative position; a cutting disk mounted on said swing arm for turning movement about an axis and moving with said swing arm so that a peripheral segment of said cutting disk is located in the region of said support in said operative position of said swing arm for cutting the object; a pinion mounted on said swing arm for turning movement and being connected with said cutting disk for turning the same; a toothed member mounted on said swing arm for turning movement about another axis spaced from said axis and meshing with said pinion, said toothed member being spaced from said peripheral segment of said cutting disk during turning of said swing arm so as to be spaced from the region of the object; and a link having one end pivoted to said supporting frame and the other end pivoted to said toothed member at a point spaced from said other axis and restraining said toothed member so that when said swing arm moves with said disk and said toothed member to and from said operative position, said toothed member turns about said other axis whereby said cutting disk is turned to cut the object along said peripheral segment while said toothed member is located outside of the region of said object.

References Cited in the file of this patent

UNITED STATES PATENTS

| 970,680 | Burkhardt | Sept. 20, 1910 |
| 2,029,032 | Olsson | Jan. 28, 1936 |
| 2,513,741 | Pinaud | July 4, 1950 |
| 2,566,574 | Lubberhuizen | Sept. 4, 1951 |

FOREIGN PATENTS

| 17,581 | Great Britain | 1903 |